US007228557B1

United States Patent
Korehisa et al.

(10) Patent No.: US 7,228,557 B1
(45) Date of Patent: Jun. 5, 2007

(54) BROADCAST PROGRAM INFORMATION PROCESSING APPARATUS

(75) Inventors: Makoto Korehisa, Kanagawa (JP); Tomoyuki Hanai, Kanagawa (JP)

(73) Assignee: Sony Corporation, Tokyo (JP)

( * ) Notice: Subject to any disclaimer, the term of this patent is extended or adjusted under 35 U.S.C. 154(b) by 1071 days.

(21) Appl. No.: 09/663,501

(22) Filed: Sep. 15, 2000

(30) Foreign Application Priority Data

Sep. 17, 1999 (JP) ................................ 11-263641

(51) Int. Cl.
  *H04N 5/445* (2006.01)
  *H04N 7/173* (2006.01)
  *G04F 13/00* (2006.01)
  *G04F 3/00* (2006.01)

(52) U.S. Cl. ........................... 725/86; 725/39; 725/46; 725/50; 725/54; 725/93

(58) Field of Classification Search ................... 725/39, 725/46, 50, 54, 93, 96, 33, 35, 97, 115–118, 725/132, 140, 146, 152

See application file for complete search history.

(56) References Cited

U.S. PATENT DOCUMENTS

| 5,121,430 | A | * | 6/1992  | Ganzer et al. ............... 380/258 |
| 5,559,548 | A | * | 9/1996  | Davis et al. .................... 725/40 |
| 5,630,007 | A |   | 5/1997  | Kobayashi et al. |
| 5,657,072 | A |   | 8/1997  | Aristides et al. |
| 5,686,954 | A | * | 11/1997 | Yoshinobu et al. ............ 725/43 |
| 5,815,145 | A |   | 9/1998  | Matthews, III |
| 5,848,396 | A | * | 12/1998 | Gerace ......................... 705/10 |
| 5,920,700 | A | * | 7/1999  | Gordon et al. ............... 709/226 |
| 6,029,045 | A | * | 2/2000  | Picco et al. .................... 725/34 |
| 6,040,829 | A | * | 3/2000  | Croy et al. .................. 715/864 |
| 6,169,543 | B1| * | 1/2001  | Wehmeyer .................... 725/47 |
| 6,173,330 | B1| * | 1/2001  | Guo et al. .................... 709/232 |
| 6,182,287 | B1| * | 1/2001  | Schneidewend et al. ....... 725/48 |
| 6,271,893 | B1| * | 8/2001  | Kawaguchi et al. ......... 348/725 |

(Continued)

FOREIGN PATENT DOCUMENTS

EP        0 858 223        8/1998

(Continued)

*Primary Examiner*—Chris Kelley
*Assistant Examiner*—Son P. Huynh
(74) *Attorney, Agent, or Firm*—Frommer Lawrence & Haug LLP; William S. Frommer; Thomas F. Presson

(57) ABSTRACT

A broadcast program information processing apparatus is provided which is capable of smoothly downloading broadcast program information to a plurality of broadcast program information receiving apparatuses from a data server in which the broadcast program information is stored. The broadcast program information receiving apparatus having a device for accessing a data server having a database in which the broadcast program information is stored and for downloading the broadcast program information downloads the broadcast program information at one of a random timing, a preset time, a random timing generated based on a preset time, a time set by a management server which manages the data server, a time set by a table in which access times to the data server are set for each region, a time set for each service provider which can be connected to the data server, and an access time to a data server, which is determined in accordance with a load distribution state of the data server.

9 Claims, 12 Drawing Sheets

U.S. PATENT DOCUMENTS

| | | | |
|---|---|---|---|
| 6,317,597 B1 * | 11/2001 | Baker et al. | 455/426.1 |
| 6,401,242 B1 * | 6/2002 | Eyer et al. | 725/35 |
| 6,463,585 B1 * | 10/2002 | Hendricks et al. | 725/35 |
| 6,505,347 B1 * | 1/2003 | Kaneko et al. | 725/39 |
| 6,536,041 B1 * | 3/2003 | Knudson et al. | 725/39 |
| 6,543,051 B1 * | 4/2003 | Manson et al. | 725/33 |
| 6,583,825 B1 * | 6/2003 | Yuen et al. | 348/731 |
| 6,637,029 B1 * | 10/2003 | Maissel et al. | 725/46 |
| 6,681,394 B1 * | 1/2004 | Fujita et al. | 725/32 |
| 6,728,269 B1 * | 4/2004 | Godwin et al. | 370/477 |
| 6,751,401 B1 * | 6/2004 | Arai et al. | 386/83 |
| 6,799,326 B2 * | 9/2004 | Boylan et al. | 725/35 |
| 6,813,775 B1 * | 11/2004 | Finseth et al. | 725/46 |
| 2003/0149988 A1 * | 8/2003 | Ellis et al. | 725/87 |
| 2005/0028208 A1 * | 2/2005 | Ellis et al. | 725/58 |

FOREIGN PATENT DOCUMENTS

| | | |
|---|---|---|
| EP | 0 899 955 | 3/1999 |
| WO | WO 99 35849 | 7/1999 |

\* cited by examiner

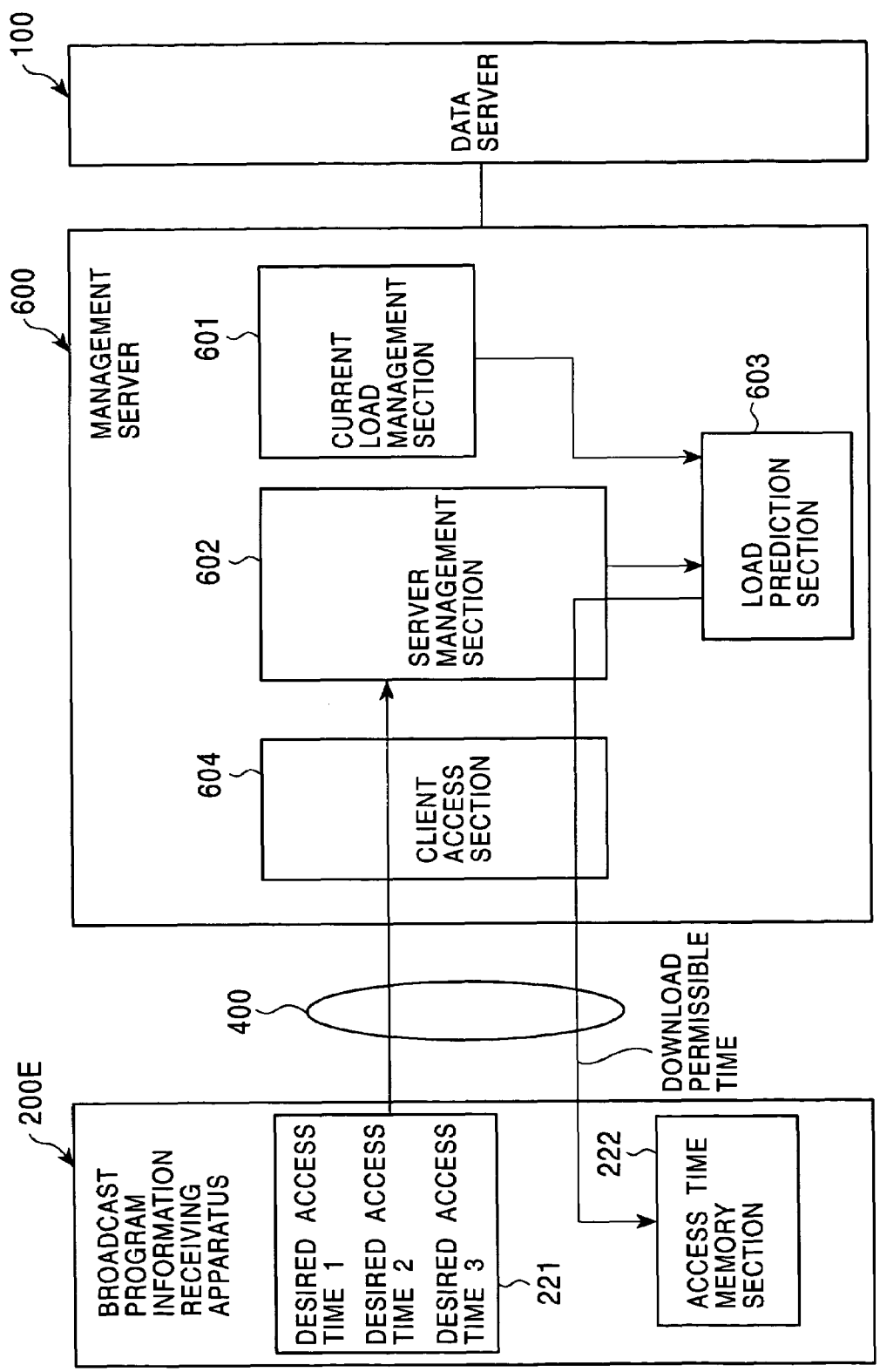

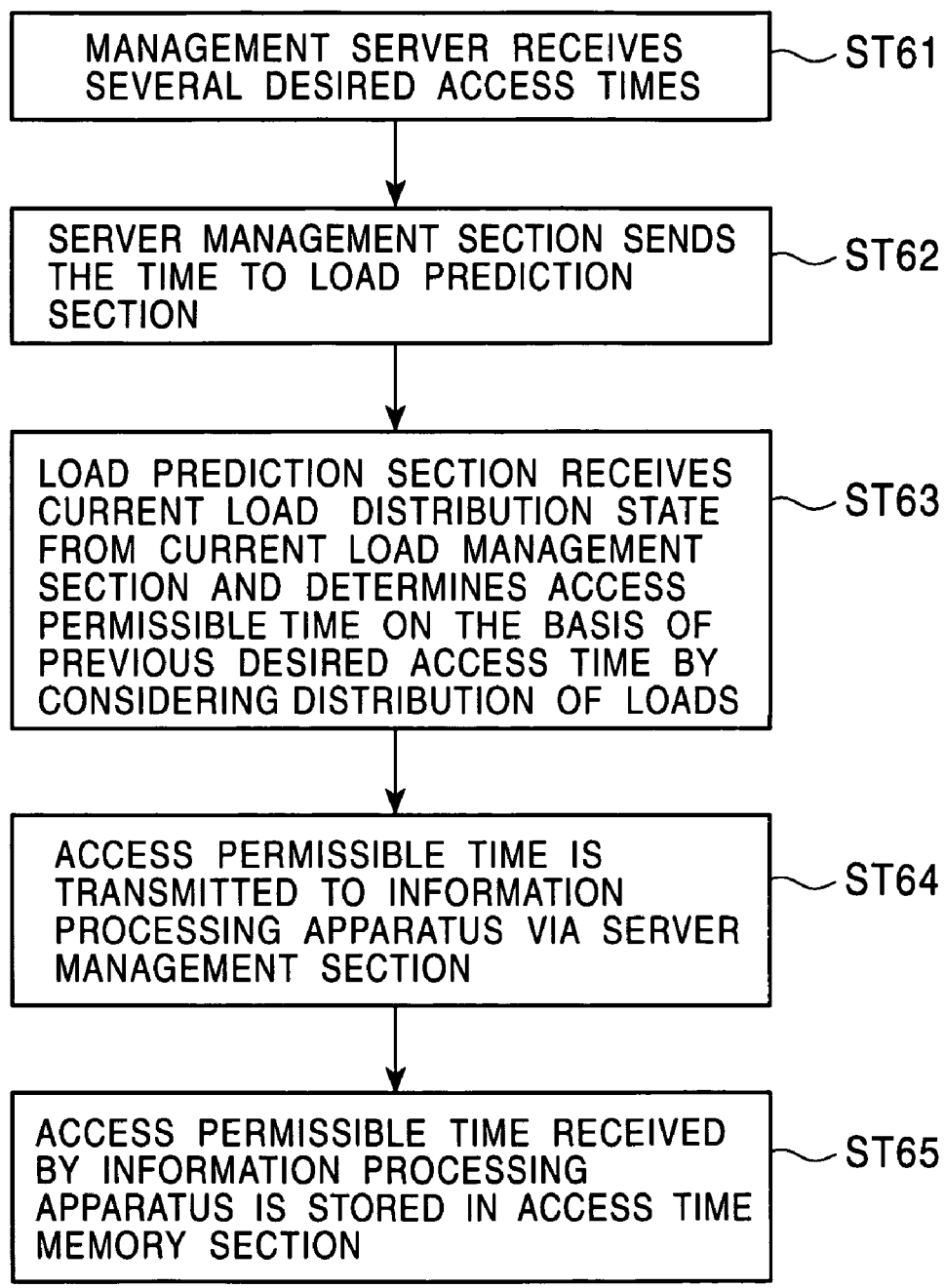

BROADCAST PROGRAM INFORMATION PROCESSING APPARATUS

BACKGROUND OF THE INVENTION

1. Field of the Invention

The present invention relates to a broadcast program information processing apparatus. More particularly, the present invention relates to a broadcast program information processing apparatus having a means for appropriately setting a time at which broadcast program information is downloaded from a data server in which the broadcast program information is stored.

2. Description of the Related Art

In conventional technology, when broadcast program information in a data server on a network, such as the Internet, is used in a household, the data server is connected to a broadcast program information receiving apparatus in a household by a telephone line, etc., the broadcast program information is downloaded collectively for a period of one week or two weeks at a desired timing in the broadcast program information receiving apparatus, and a user selects the broadcast program information from the data server by using a terminal device, making it possible for the user to view a desired broadcast program by using the broadcast program information without being conscious of the line speed.

However, the timing at which broadcast program information is downloaded from a data server on a network is often late at night so that a user is not aware of the fact that the telephone line, which is a communication means for connecting the data server to the broadcast program information receiving apparatus, is slow. For this reason, there occurs a problem of a decrease in response caused by traffic concentration of a communication line and an increase in the load on the data server, in particular, in a late-night time zone. Therefore, there is a problem which must be solved in that broadcast program information is downloaded smoothly to a plurality of broadcast program information receiving apparatuses from a data server in which broadcast program information is stored.

SUMMARY OF THE INVENTION

In order to solve the above-mentioned problem, the broadcast program information processing apparatus of the present invention comprises a means for accessing a data server having a database in which broadcast program information is stored and for downloading the broadcast program information.

The downloading means of each of the broadcast program information receiving apparatuses comprises one of the following means: means for downloading broadcast program information at a random timing; means for downloading broadcast program information from a data server at a preset time; means for downloading broadcast program information from a data server at a random timing based on a preset time; means for downloading broadcast program information at a time set by a management server which manages the data server; means, having a table in which access times to data servers are set for each region, for downloading broadcast program information at a time set by the table; means for downloading broadcast program information at a time set by a service provider which can be connected to the broadcast program information receiving apparatus; and means for determining an access time to the data server in accordance with the load distribution state of the data servers and for downloading broadcast program information at the determined access time.

Use of a broadcast program information processing apparatus having a means for downloading broadcast program information in this manner causes an access time to a data server in which broadcast program information is stored on a network to be set for each broadcast program information receiving apparatus. This makes it possible to spread out accesses to the data server.

The above and further objects, aspects and novel features of the invention will become more fully apparent from the following detailed description when read in conjunction with the accompanying drawings.

BRIEF DESCRIPTION OF THE DRAWINGS

FIG. 11 is a block diagram schematically showing a means for downloading broadcast program information from a data server on a network to a broadcast program information receiving apparatus in a broadcast program information processing apparatus according to a sixth embodiment of the present invention.

FIG. 12 is a flowchart showing the operation of the broadcast program information receiving apparatus having the downloading means in FIG. 11.

DESCRIPTION OF THE PREFERRED EMBODIMENTS

Various embodiments of a broadcast program information processing apparatus according to the present invention are described below with reference to the drawings.

Figure 1:
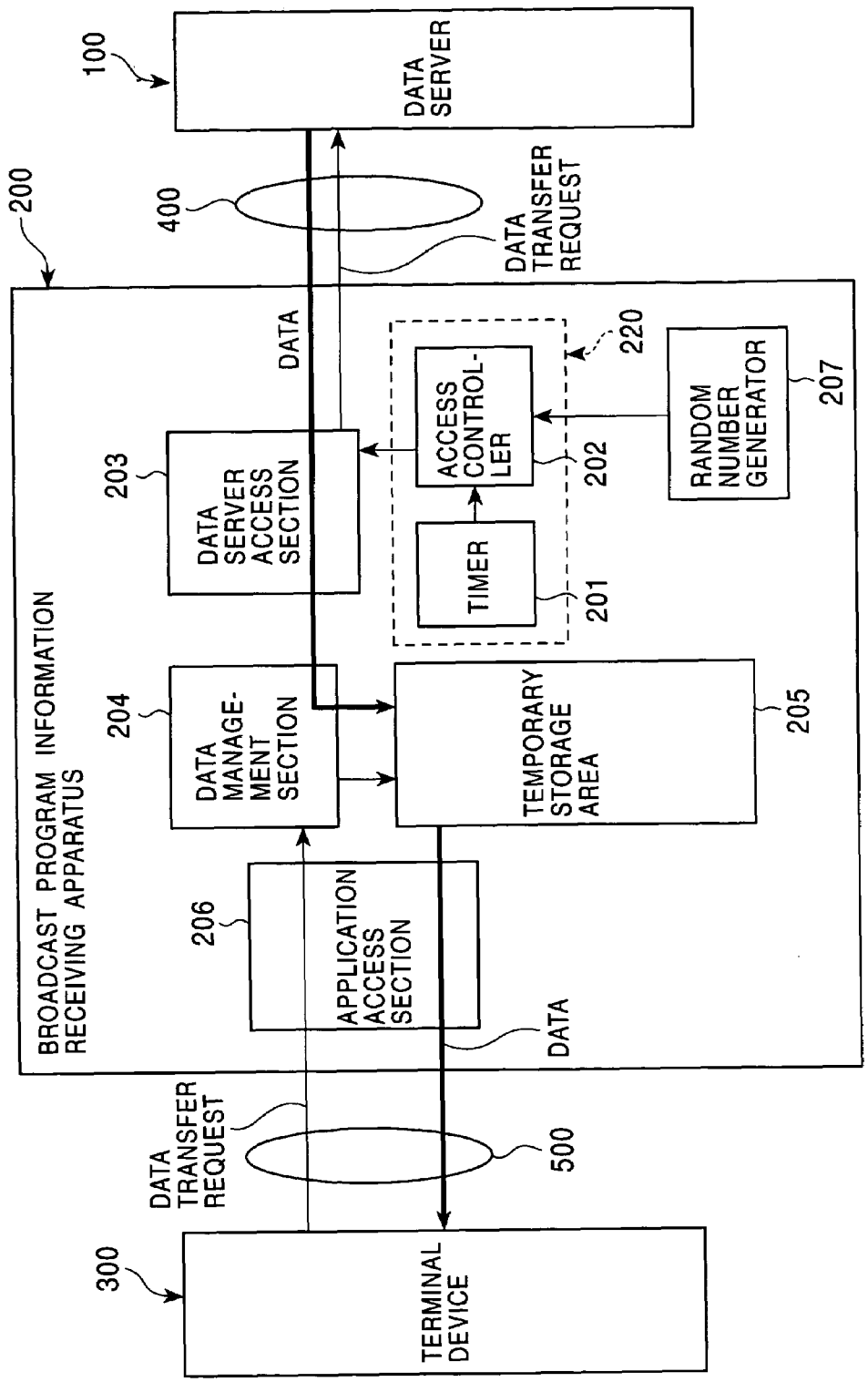
FIG. 1 is a block diagram schematically showing a means for downloading broadcast program information from a data server on a network to a broadcast program information receiving apparatus in a broadcast program information processing apparatus according to a first embodiment of the present invention.

A broadcast program information processing apparatus according to a first embodiment of the present invention, as shown in FIG. 1, comprises a means for downloading broadcast program information from a data server on a network at a random timing. The broadcast program information processing apparatus comprises a data server 100 on a network, a broadcast program information receiving apparatus 200 which can be disposed in a household, and a terminal device 300. The data server 100 and the broadcast program information receiving apparatus 200 are connected to each other by a low-speed line 400, such as a telephone line, and the broadcast program information receiving apparatus 200 and the terminal device 300 are connected to each other by a high-speed line 500, such as a LAN.

The data server 100 has a database capable of storing broadcast program information, and for the broadcast program information in the embodiment, electronic program guide (EPG) information data are stored therein.

The broadcast program information receiving apparatus 200 comprises a random number generator 207 for generating a random time, which is a part of a downloading means, an access control section 220 having a timer 201 for setting time information and an access controller 202 for monitoring the time information of the timer 201 and the random number generator 207 for making a data transfer request to a data server access section 203, the data server access section 203 for making a data transfer request for downloading broadcast program information to the data server 100 in accordance with an instruction from the access control section 220 and for sending the broadcast program information sent from the data server 100 to a data management section 204, the data management section 204 for storing the broadcast program information sent from the data server 100 in a temporary storage area 205 via the data server access section 203 and for instructing the data transfer request from the terminal device 300 to the temporary storage area 205 via an application access section 206, the temporary storage area 205 for storing the broadcast program information sent from the data server 100 and for sending the broadcast program information to the terminal device 300 via the application access section 206 in accordance with an instruction from the data management section 204, and the application access section 206 for transmitting the data transfer request from the terminal device 300 to the data management section 204 and for sending the broadcast program information sent from the temporary storage area 205 to the terminal device 300.

The terminal device 300 has an application for a user to access the broadcast program information receiving apparatus 200 and to make a request for the data of the broadcast program information.

Figure 2:
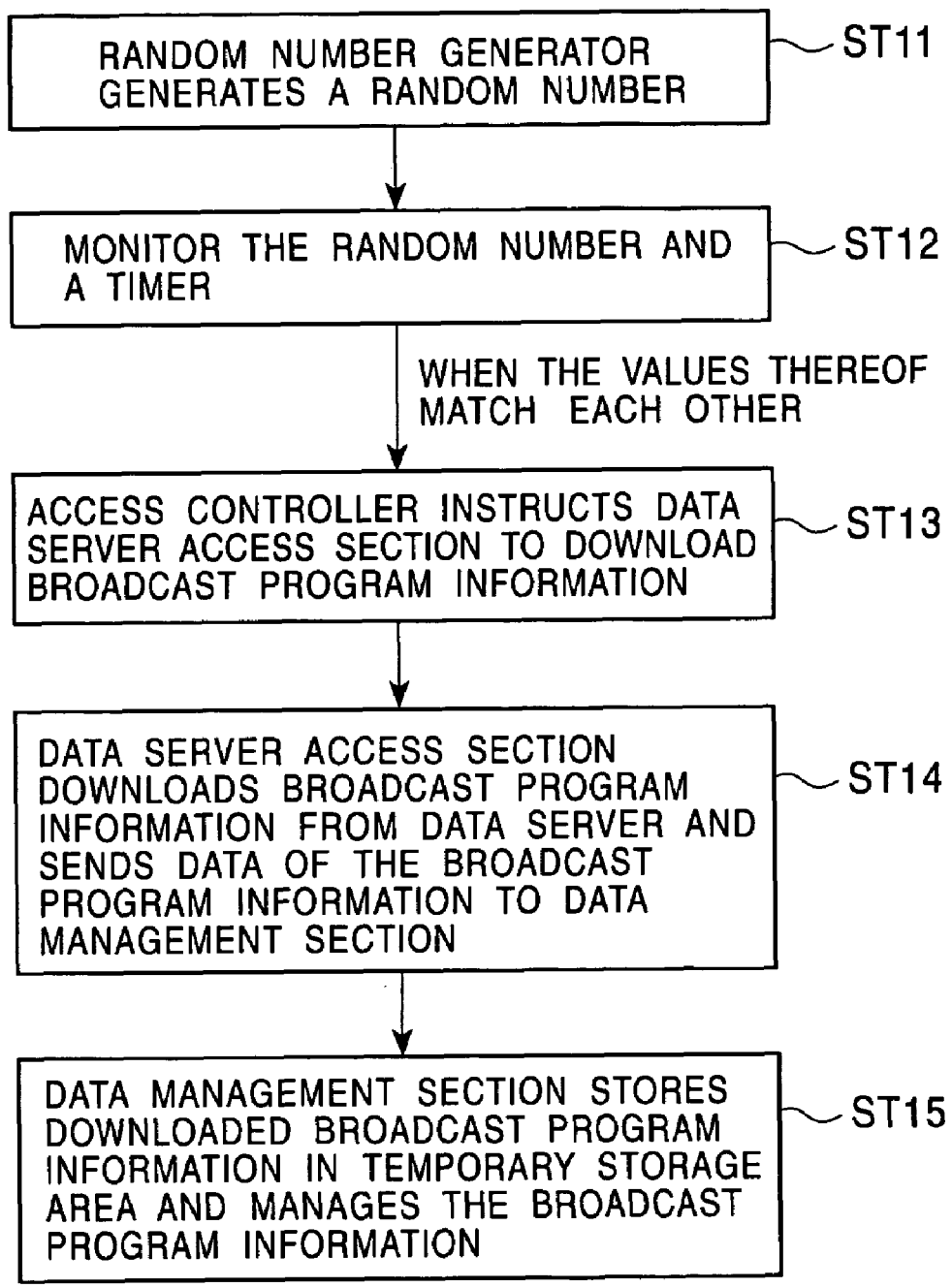
FIG. 2 is a flowchart showing the operation of the broadcast program information receiving apparatus having the downloading means in FIG. 1.

Next, a system is constructed in which the data server 100 and the broadcast program information receiving apparatus 200, having the above-described construction, are connected to each other by a low-speed line 400, such as a telephone line, and the broadcast program information receiving apparatus 200 and the terminal device 300 are connected to each other by a high-speed line 500, such as a LAN. The operation of the broadcast program information receiving apparatus 200 when broadcast program information is downloaded from the data server 100 is described below by referring to the flowchart shown in FIG. 2.

Initially, the random number generator 207 generates a random time (step ST11).

Next, the access control section 220 causes the access controller 202 to monitor the random time of the random number generator 207 and the time information of the timer 201 and issues a command to the data server access section 203 when the time information match so that a data transfer request for downloading broadcast program information is made to the data server 100 (steps ST12 and ST13).

The data server access section 203 makes a data transfer request to the data server 100 in accordance with a command from the access control section 220 via the low-speed line 400, and sends the broadcast program information downloaded from the data server 100 to the data management section 204 (step ST14).

The data management section 204 stores the downloaded broadcast program information in the temporary storage area 205 and manages the data of the broadcast program information (step ST15). In this manner, the broadcast program information is downloaded from the data server 100 to the broadcast program information receiving apparatus 200.

The user using the broadcast program information downloaded to the broadcast program information receiving apparatus 200 makes a data transfer request to the broadcast program information receiving apparatus 200 from the application of the terminal device 300. The broadcast program information receiving apparatus 200 transmits the data transfer request to the data management section 204 via the application access section 206. The data management section 204 issues, to the temporary storage area 205, an instruction for transmitting the data of the broadcast program information to the terminal device 300. The temporary storage area 205 sends the requested broadcast program information to the terminal device 300 by using the high-speed line 500 via the application access section 206. In this manner, the user controlling the terminal device 300 obtains the broadcast program information and can select desired program information therefrom.

Figure 3:
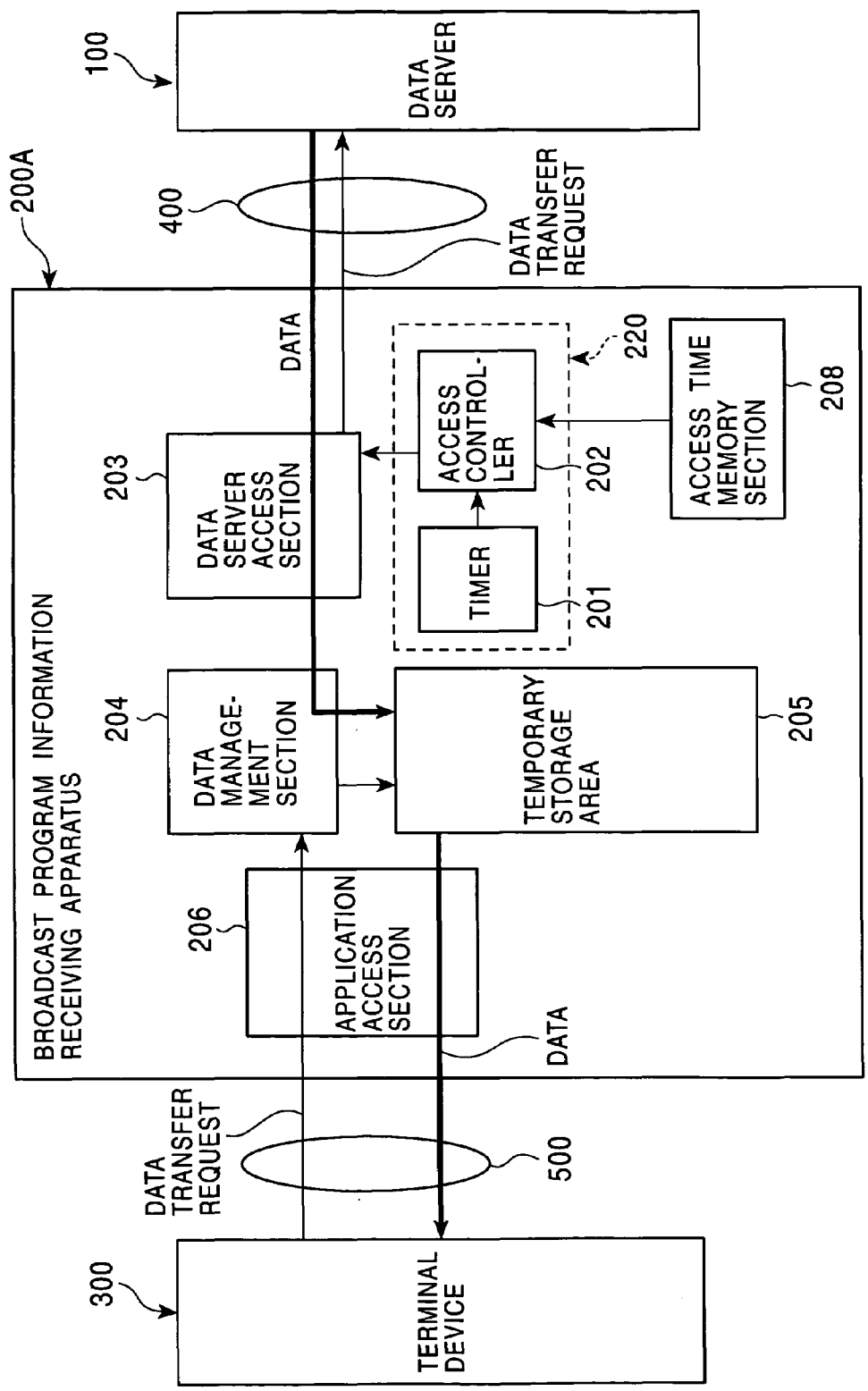
FIG. 3 is a block diagram schematically showing a means for downloading broadcast program information from a data server on a network to a broadcast program information receiving apparatus in a broadcast program information processing apparatus according to a second embodiment of the present invention.

Next, a broadcast program information processing apparatus according to a second embodiment of the present invention is described below with reference to FIG. 3.

The broadcast program information processing apparatus of the second embodiment comprises a means for downloading broadcast program information from a data server on a network at a preset time. The broadcast program information processing apparatus comprises a data server 100 on a network, a broadcast program information receiving apparatus 200A in a household, and a terminal device 300. The data server 100 and the broadcast program information receiving apparatus 200A are connected to each other by a low-speed line 400, such as a telephone line, and the broadcast program information receiving apparatus 200A and the terminal device 300 are connected to each other by a high-speed line 500, such as a LAN.

The data server 100 has a database capable of storing broadcast program information, and for the broadcast program information in the embodiment, electronic program guide (EPG) information data are stored therein.

The broadcast program information receiving apparatus 200A comprises an access time memory section 208, which is a downloading means, for storing an access permissible time, an access control section 220 having a timer 201 for setting time information and an access controller 202 for monitoring the time information of the timer 201 and an access time memory section 208 and for making a data transfer request to a data server access section 203, the data server access section 203 for making a data transfer request for downloading broadcast program information to the data server 100 in accordance with an instruction from the access control section 220 and for sending the broadcast program information sent from the data server 100 to a data management section 204, the data management section 204 for storing the broadcast program information sent from the data server 100 in the temporary storage area 205 via the data server access section 203 and for instructing a data transfer request from the terminal device 300 to the temporary storage area 205 via an application access section 206, the temporary storage area 205 for storing the broadcast program information sent from the data server 100 and for sending the broadcast program information to the terminal device 300 via the application access section 206 in accordance with an instruction from the data management section 204, and the application access section 206 for transmitting the data transfer request from the terminal device 300 to the data management section 204 and for sending the broadcast program information sent from the temporary storage area 205 to the terminal device 300.

The terminal device 300 has an application for a user to access the broadcast program information receiving apparatus 200A and to make a request for the data of the broadcast program information.

Figure 4:
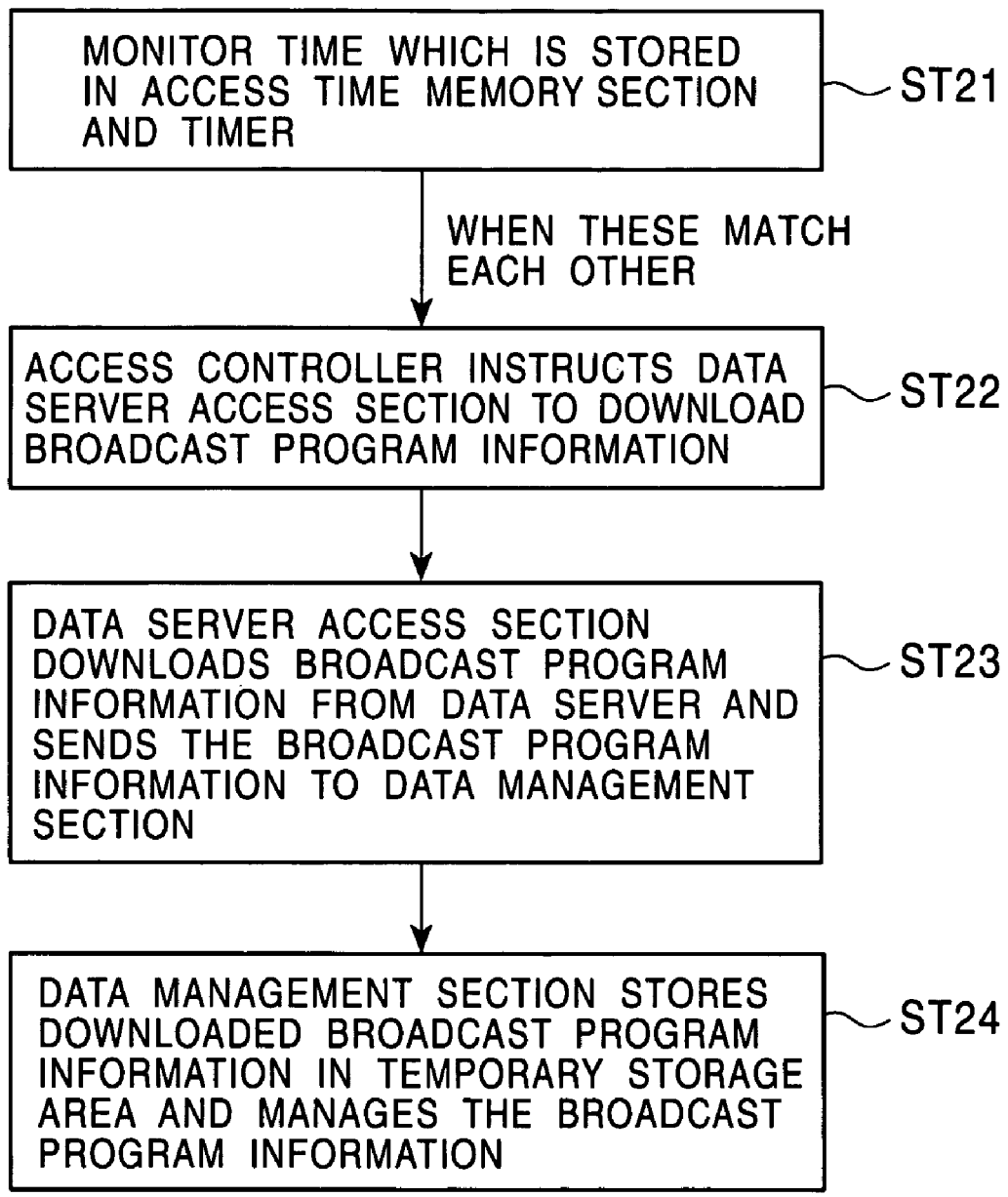
FIG. 4 is a flowchart showing the operation of the broadcast program information receiving apparatus having the downloading means in FIG. 3.

A system is constructed in which the data server 100 and the broadcast program information receiving apparatus 200A, having the above-described construction, are connected to each other by a low-speed line 400, such as a telephone line, and the broadcast program information receiving apparatus 200A and the terminal device 300 are connected to each other by a high-speed line 500, such as a LAN. The operation of the broadcast program information receiving apparatus 200A when broadcast program information is downloaded from the data server 100 is described below with reference to the flowchart shown in FIG. 4.

Initially, the access control section 220 causes the access controller 202 to monitor the time stored in an access time memory section 208 and the time information from the timer 201 and issues a command to the data server access section 203 when the time information match so that a data transfer request for downloading broadcast program information is made to the data server 100 (steps ST21 and ST22).

The data server access section 203 makes a data transfer request to the data server 100 in accordance with a command from the access control section 220 via the low-speed line 400 and sends the broadcast program information downloaded from the data server 100 to the data management section 204 (step ST23).

The data management section 204 stores the downloaded broadcast program information in, the temporary storage area 205 and manages the data of the broadcast program information (step ST24). In this manner, the broadcast program information is downloaded from the data server 100 to the broadcast program information receiving apparatus 200A.

The user using the broadcast program information downloaded to the broadcast program information receiving apparatus 200A makes a data transfer request to the broadcast program information receiving apparatus 200A from the application of the terminal device 300. The broadcast program information receiving apparatus 200A transmits the data transfer request to the data management section 204 via the application access section 206. The data management section 204 issues, to the temporary storage area 205, an instruction for transmitting the data of the broadcast program information to the terminal device 300. The temporary storage area 205 sends the requested broadcast program information to the terminal device 300 by using the high-speed line 500 via the application access section 206. In this manner, it is possible for the user controlling the terminal device 300 to obtain the broadcast program information and to select desired program information therefrom.

Figure 5:
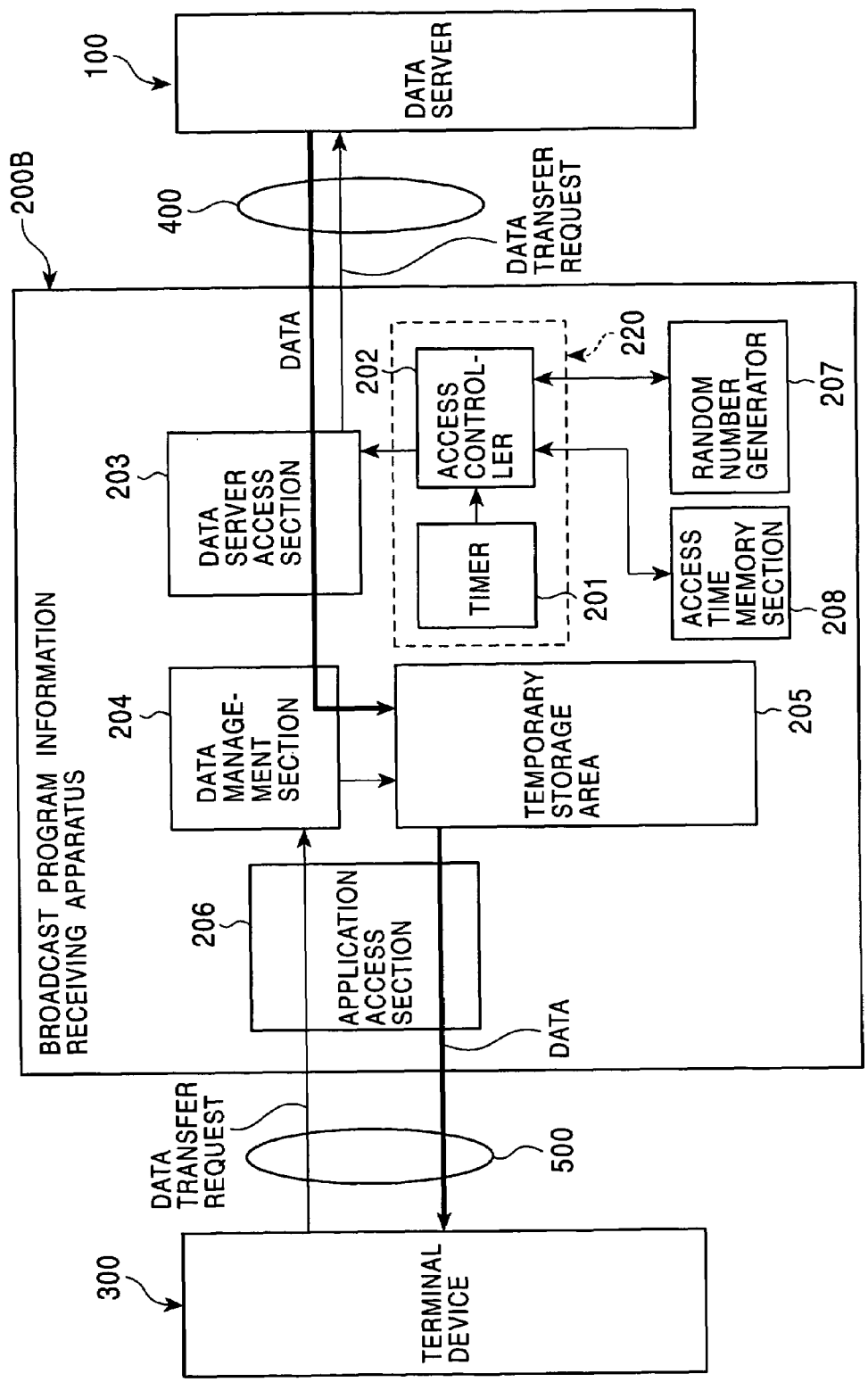
FIG. 5 is a block diagram schematically showing a means for downloading broadcast program information from a data server on a network to a broadcast program information receiving apparatus in a broadcast program information processing apparatus according to a third embodiment of the present invention.

Next, a broadcast program information processing apparatus according to a third embodiment of the present invention is described below with reference to FIG. 5.

The broadcast program information processing apparatus of the third embodiment comprises a means for downloading broadcast program information from a data server on a network at a random timing based on a preset time. The broadcast program information processing apparatus comprises a data server 100 on a network, a broadcast program information receiving apparatus 200B in a household, and a terminal device 300. The data server 100 and the broadcast program information receiving apparatus 200B are connected to each other by a low-speed line 400, such as a telephone line, and the broadcast program information receiving apparatus 200B and the terminal device 300 are connected to each other by a high-speed line 500, such as a LAN.

The data server 100 has a database capable of storing broadcast program information, and for broadcast program information in the embodiment, electronic program guide (EPG) information data are stored therein.

The broadcast program information receiving apparatus 200B comprises a random number generator 207 for generating a random time, which is a part of a downloading means, an access time memory section 208 for storing an access permissible time, an access control section 220 having a timer 201 for setting time information and an access controller 202 for making a data transfer request to the data server access section 203 by monitoring the time information of the timer 201, and the random number generator 207 or the access time memory section 208, a data server access section 203 for making a data transfer request for downloading broadcast program information to the data server 100 in accordance with an instruction from the access control section 220 and for sending the broadcast program information sent from the data server 100 to the data management section 204, a data management section 204 for storing the broadcast program information sent from the data server 100 in the temporary storage area 205 via the data server access section 203 and for instructing the data transfer request from the terminal device 300 to the temporary storage area 205 via the application access section 206, the temporary storage area 205 for storing the broadcast program information sent from the data server 100 and for sending the data of the broadcast program information to the terminal device 300 via the application access section 206 in accordance with an instruction from the data management section 204, and the application access section 206 for transmitting the data transfer request from the terminal device 300 to the data management section 204 and for sending the broadcast program information sent from the temporary storage area 205 to the terminal device 300.

The terminal device 300 has an application for a user to access the broadcast program information receiving apparatus 200B and to request the data of the broadcast program information.

Figure 6:
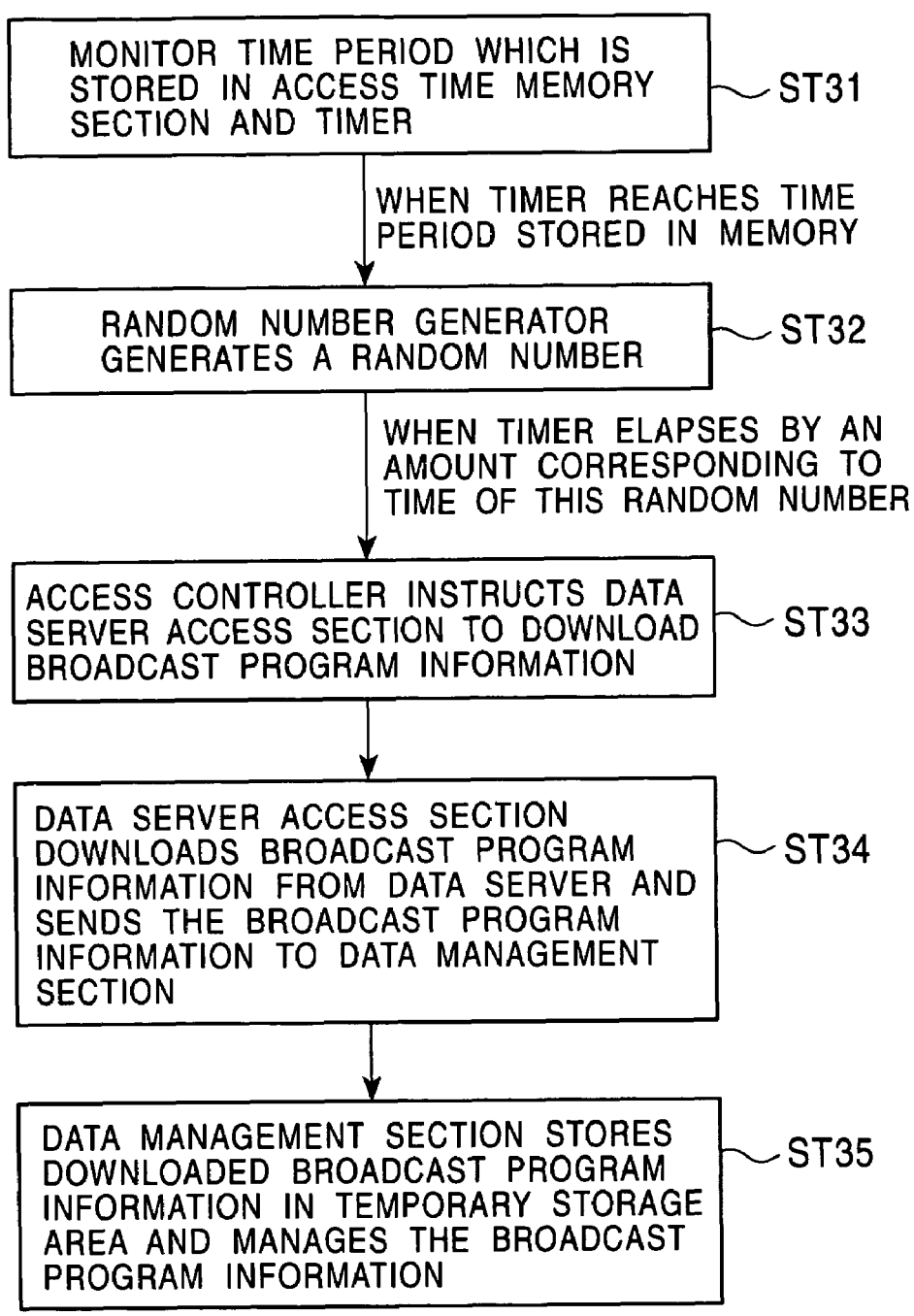
FIG. 6 is a flowchart showing the operation of the broadcast program information receiving apparatus having the downloading means in FIG. 5.

A system is constructed in which the data server 100 and the broadcast program information receiving apparatus 200B, having the above-described construction, are connected to each other by a low-speed line 400, such as a telephone line, and the broadcast program information receiving apparatus 200B and the terminal device 300 are connected to each other by a high-speed line 500, such as a LAN. The operation of the broadcast program information receiving apparatus 200B when broadcast program information is downloaded from the data server 100 is described below by referring to the flowchart shown in FIG. 6.

Initially, in the access control section 220, the access controller 202 monitors the time stored in the access time memory section 208 and the time information from the timer 201, and a random number generator 207 generates a random time when the time information match (steps ST31 and ST32).

Here, the maximum of the random time generated by the random number generator 207 is the same as the width of the access permissible time period of the data server 100.

Next, the access controller 202 monitors the random time of the random number generator 207 and the time information from the timer 201, and issues an instruction to the data server access section 203 when the time information match so that a data transfer request is made to the data server 100 (step ST33).

The data server access section 203 makes a data transfer request to the data server 100 in accordance with a command from the access control section 220 via the low-speed line 400 and sends the broadcast program information downloaded from the data server 100 to the data management section 204 (step ST34).

The data management section 204 stores the downloaded broadcast program information in the temporary storage area 205 and manages the data of the broadcast program information (step ST35). In this manner, the broadcast program information is downloaded from the data server 100 to the broadcast program information receiving apparatus 200B.

The user using the broadcast program information downloaded to the broadcast program information receiving apparatus 200B makes a data transfer request to the broadcast program information receiving apparatus 200B from the application of the terminal device 300. The broadcast program information receiving apparatus 200B transmits the data transfer request to the data management section 204 via the application access section 206. The data management section 204 issues, to the temporary storage area 205, an instruction for transmitting the data of the broadcast program information to the terminal device 300. The temporary storage area 205 sends the requested broadcast program information to the terminal device 300 by using the high-speed line 500 via the application access section 206. In this manner, it is possible for the user controlling the terminal device 300 to obtain the broadcast program information and to select desired program information therefrom.

Figure 7:
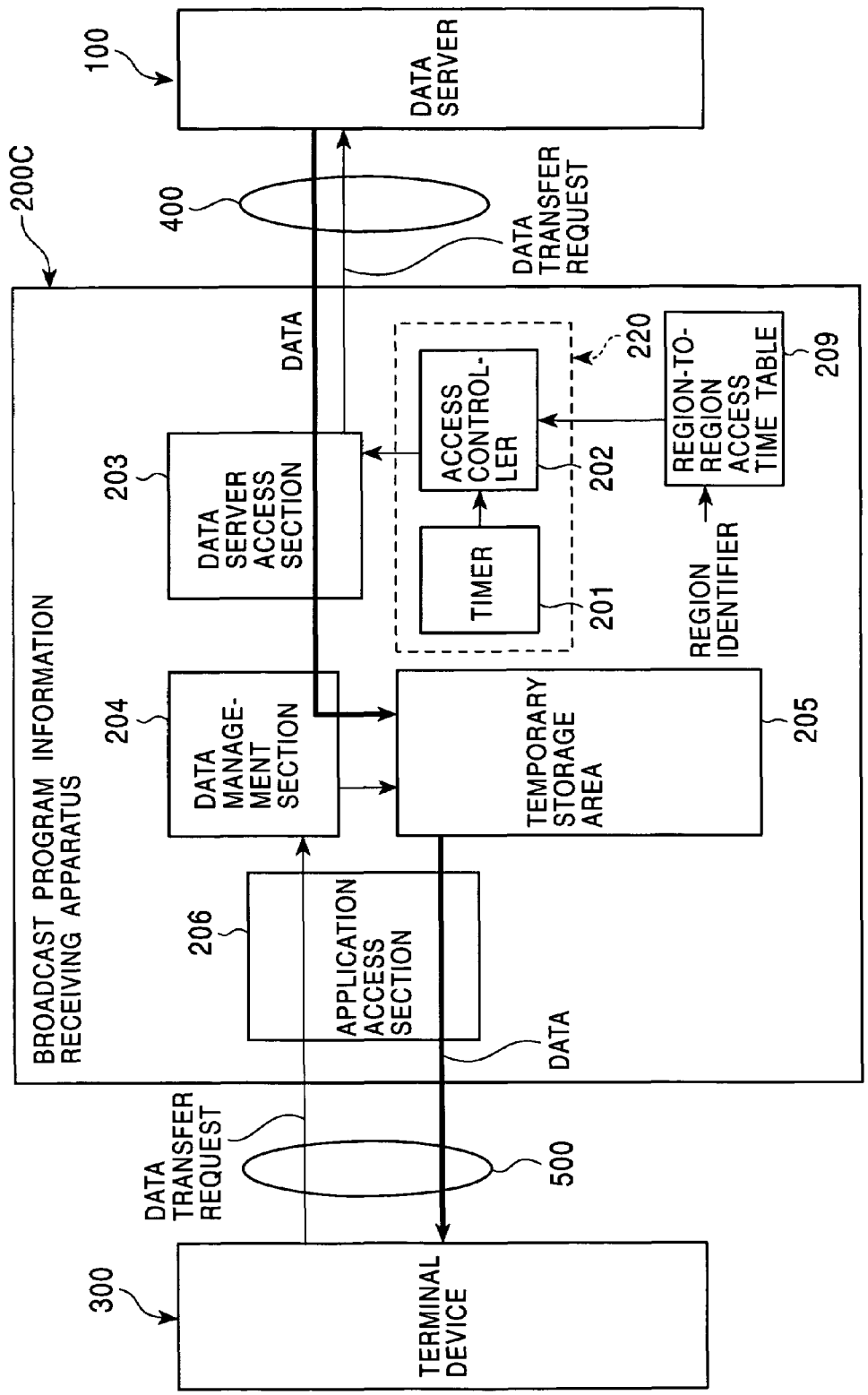
FIG. 7 is a block diagram schematically showing a means for downloading broadcast program information from a data server on a network to a broadcast program information receiving apparatus in a broadcast program information processing apparatus according to a fourth embodiment of the present invention.

Next, a broadcast program information processing apparatus according to a fourth embodiment of the present invention is described below with reference to FIG. 7.

The broadcast program information processing apparatus of the fourth embodiment comprises a means for downloading broadcast program information from a data server on a network in accordance with a region-to-region access time table. The broadcast program information processing apparatus comprises a data server 100 on a network, a broadcast program information receiving apparatus 200C in a household, and a terminal device 300. The data server 100 and the broadcast program information receiving apparatus 200C are connected to each other by a low-speed line 400, such as a telephone line, and the broadcast program information receiving apparatus 200C and the terminal device 300 are connected to each other by a high-speed line 500, such as a LAN.

The data server 100 has a database capable of storing broadcast program information, and for the broadcast program information in the embodiment, electronic program guide (EPG) information data are stored therein.

The broadcast program information receiving apparatus 200C has a region-to-region access time table 209 in which is stored information of access permissible times to the data server 100, which are assigned for each region by a region code which is an identifier of a table, an access control section 220 having a timer 201 for setting time information and an access controller 202 for monitoring the time information of the timer 201 and the region-to-region access time table 209 and for making a data transfer request to the data server access section 203, a data server access section 203 for making a data transfer request for downloading broadcast program information to the data server 100 in accordance with an instruction from an access control section 220 and for sending the broadcast program information sent from the data server 100 to the data management section 204, a data management section 204 for storing the broadcast program information sent from the data server 100 in the temporary storage area 205 via the data server access section 203 and for instructing the data transfer request from the terminal device 300 to the temporary storage area 205 via the application access section 206, the temporary storage area 205 for storing the broadcast program information sent from the data server 100 and for sending the broadcast program information to the terminal device 300 via the application access section 206 in accordance with an instruction from the data management section 204, and the application access section 206 for transmitting the data transfer request from the terminal device 300 to the data management section 204 and for sending the broadcast program information sent from the temporary storage area 205 to the terminal device 300.

The terminal device 300 has an application for a user to access the broadcast program information receiving apparatus 200C and to request the data of the broadcast program information.

Figure 8:
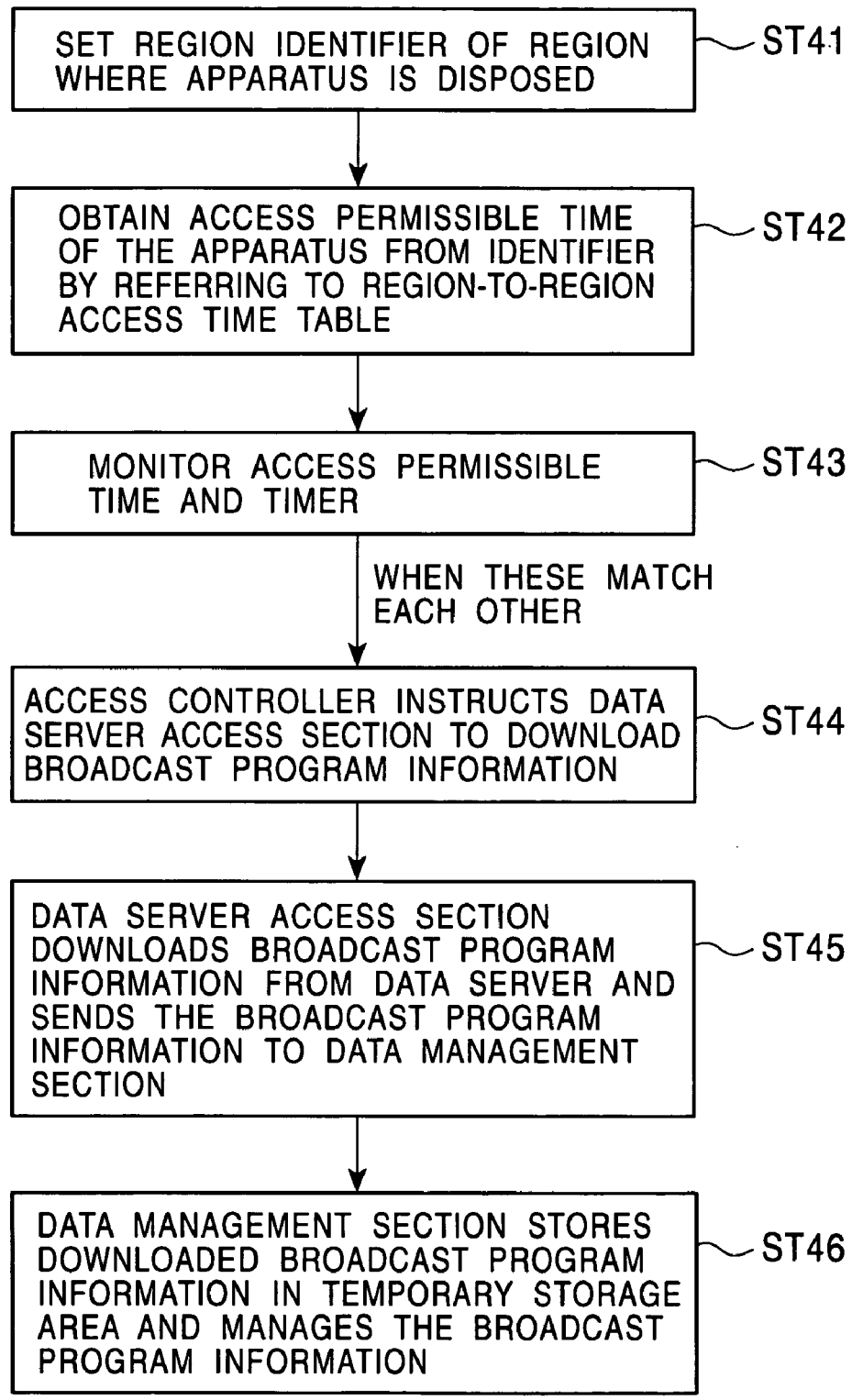
FIG. 8 is a flowchart showing the operation of the broadcast program information receiving apparatus having the downloading means in FIG. 7.

A system is constructed in which the data server 100 and the broadcast program information receiving apparatus 200C, having the above-described construction, are connected to each other by a low-speed line 400, such as a telephone line, and the broadcast program information receiving apparatus 200C and the terminal device 300 are connected to each other by a high-speed line 500, such as a LAN. The operation of the broadcast program information receiving apparatus 200C when broadcast program information is downloaded from the data server 100 is described below by referring to the flowchart shown in FIG. 8.

Initially, a region identifier of a region where the broadcast program information receiving apparatus 200C is disposed is set therein (step ST41).

Next, in the access control section 220, the access controller 202 obtains an access permissible time to a server corresponding to a region identifier from the set region identifier by referring to the region-to-region access time table 209 (step ST42).

For the region-to-region access time table 209, a table is used in which a region code used as an identifier thereof is a postal code, a telephone area code, or a code for an urgent warning broadcast.

Then, the access controller 202 monitors the time information from the timer 201, and issues a command to the data server access section 203 when the time information matches the access permissible time so that a data transfer request is made to the data server 100 (steps ST43 and ST44).

The data server access section 203 makes a data transfer request to the data server 100 in accordance with a command from the access control section 220 via the low-speed line 400 and sends the broadcast program information downloaded from the data server 100 to the data management section 204 (step ST45).

The data management section 204 stores the downloaded broadcast program information in the temporary storage area 205 and manages the data of the broadcast program information (step ST46). In this manner, the broadcast program information is downloaded from the data server 100 to the broadcast program information receiving apparatus 200C.

The user using the broadcast program information downloaded to the broadcast program information receiving apparatus 200C makes a data transfer request to the broadcast program information receiving apparatus 200C from the application of the terminal device 300. The broadcast program information receiving apparatus 200C transmits the broadcast program information to the data management section 204 via the application access section 206. The data management section 204 issues, to the temporary storage area 205, an instruction for transmitting the data of the broadcast program information to the terminal device 300. The temporary storage area 205 sends the requested broadcast program information to the terminal device 300 by using the high-speed line 500 via the application access section 206. In this manner, it is possible for the user controlling the terminal device 300 to obtain the broadcast program information and to select desired program information therefrom.

Figure 9:
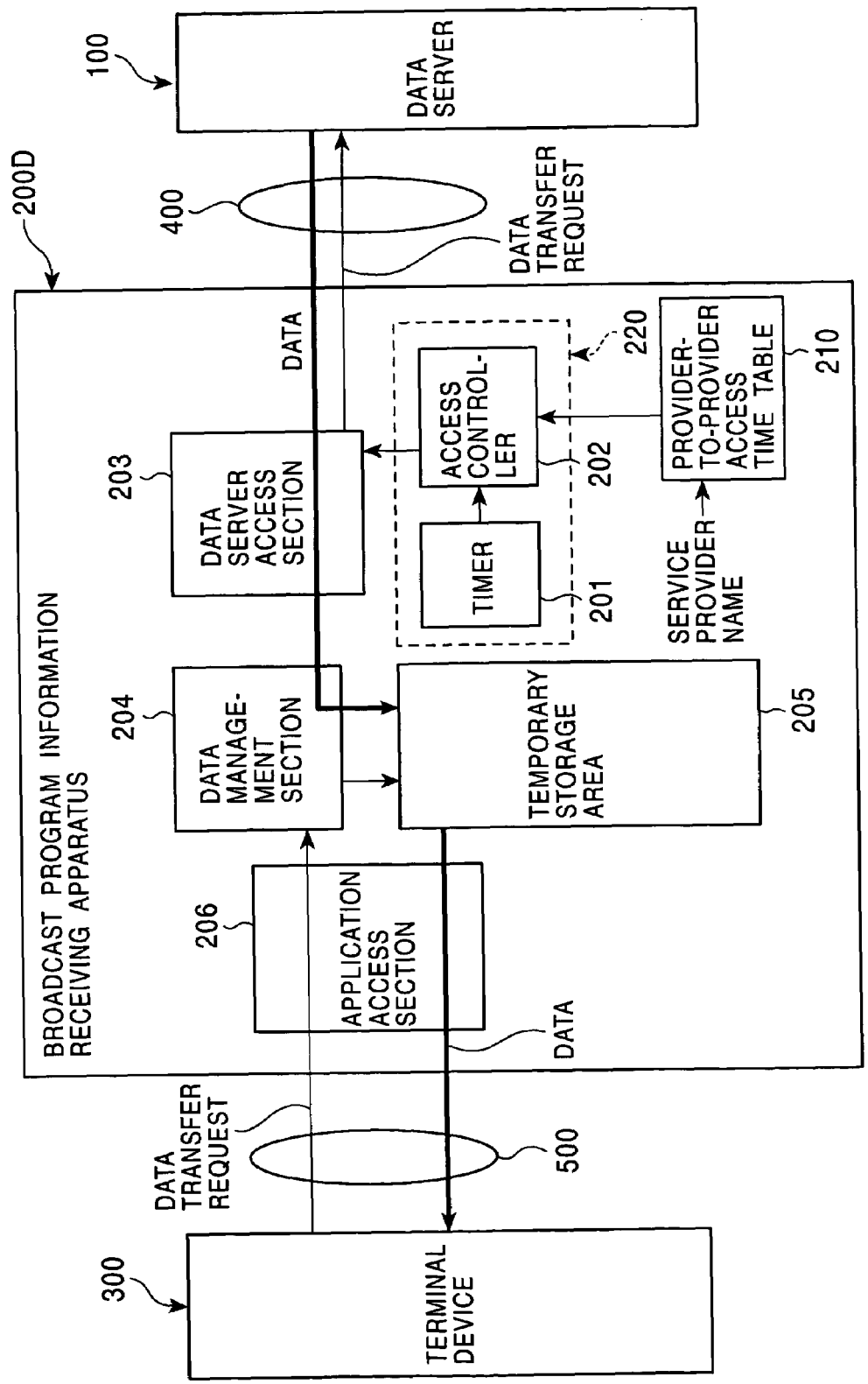
FIG. 9 is a block diagram schematically showing a means for downloading broadcast program information from a data server on a network to a broadcast program information receiving apparatus in a broadcast program information processing apparatus according to a fifth embodiment of the present invention.

Next, a broadcast program information processing apparatus according to a fifth embodiment of the present invention is described below with reference to FIG. 9.

The broadcast program information processing apparatus of the fifth embodiment comprises a means for downloading broadcast program information from a data server on a network at a time set for each service provider which can be connected to a broadcast program information receiving apparatus. The broadcast program information processing apparatus comprises a data server 100 on a network, a broadcast program information receiving apparatus 200D in a household, and a terminal device 300. The data server 100 and the broadcast program information receiving apparatus 200D are connected to each other by a low-speed line 400, such as a telephone line, and the broadcast program information receiving apparatus 200D and the terminal device 300 are connected to each other by a high-speed line 500, such as a LAN.

The data server 100 has a database capable of storing broadcast program information, and for broadcast program information in the embodiment, electronic program guide (EPG) information data are stored therein.

The broadcast program information receiving apparatus 200D comprises a provider-to-provider access time table 210 in which is stored information of access permissible times to the data server 100, which an assigned for each service provider, an access control section 220 having a timer 201 for setting time information and an access controller 202 for monitoring the time information of the timer 201 and the provider-to-provider access time table 210 and for making a data transfer request to a data server access section 203, the data server access section 203 for making a data transfer request for downloading broadcast program information to the data server 100 in accordance with an instruction from an access control section 220 and for sending the broadcast program information sent from the data server 100 to a data management section 204, the data management section 204 for storing the broadcast program information sent from the data server 100 in the temporary storage area 205 via the data server access section 203 and for instructing the data transfer request from the terminal device 300 to the temporary storage area 205 via an application access section 206, the temporary storage area 205 for storing the broadcast program information sent from the data server 100 and for sending the broadcast program information to the terminal device 300 via the application access section 206 in accordance with an instruction from the data management section 204, and the application access section 206 for transmitting the data transfer request from the terminal device 300 to the data management section 204 and for sending the broadcast program information sent from the temporary storage area 205 to the terminal device 300.

The terminal device 300 has an application for a user to access the broadcast program information receiving apparatus 200D and to make a request for the data of the broadcast program information.

Figure 10:
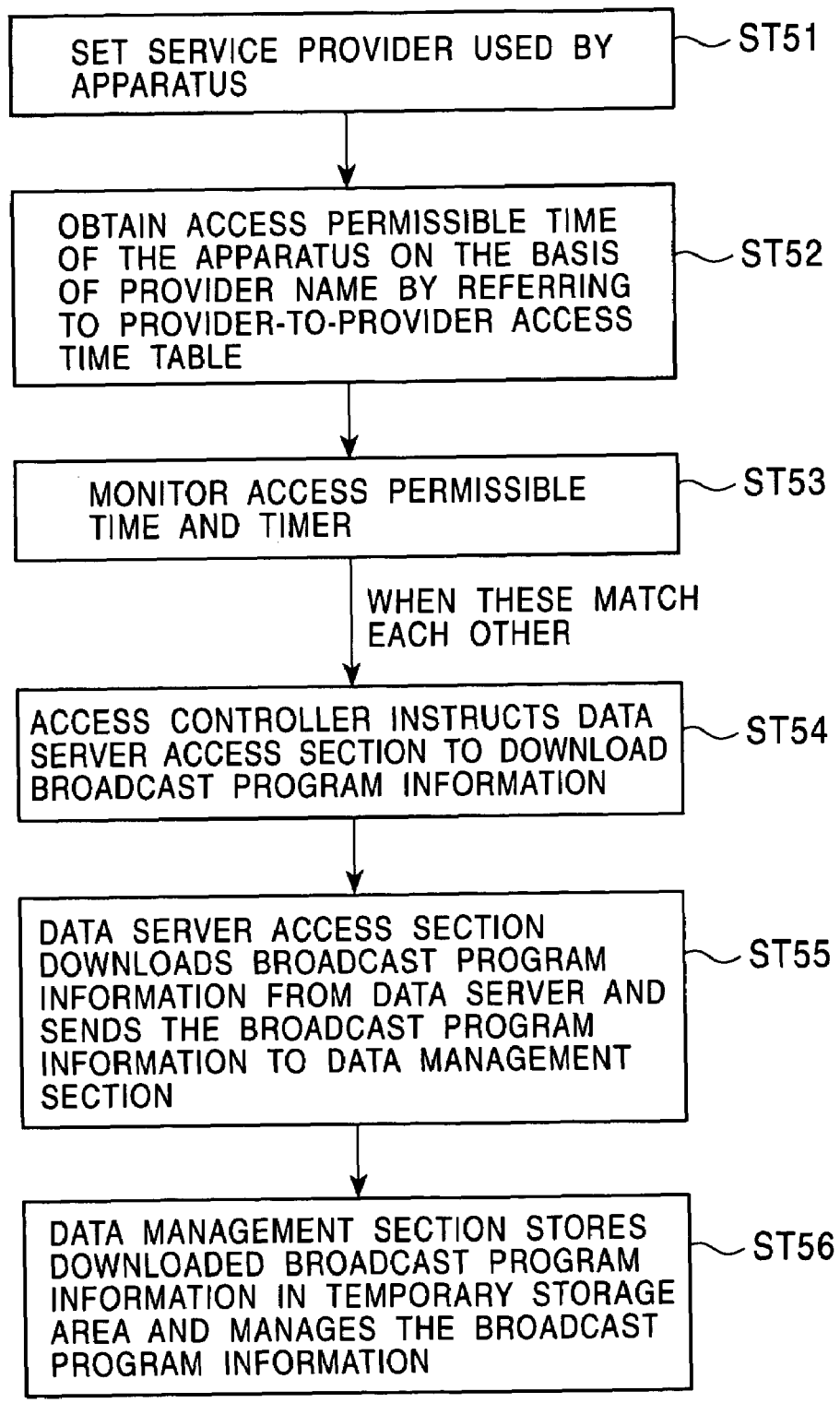
FIG. 10 is a flowchart showing the operation of the broadcast program information receiving apparatus having the downloading means in FIG. 9.

A system is constructed in which the data server 100 and the broadcast program information receiving apparatus 200D, having the above-described construction, are connected to each other by a low-speed line 400, such as a telephone line, and the broadcast program information receiving apparatus 200D and the terminal device 300 are connected to each other by a high-speed line 500, such as a LAN. The operation of the broadcast program information receiving apparatus 200D when broadcast program information is downloaded from the data server 100 is described below by referring to the flowchart shown in FIG. 10.

Initially, a service provider name to be used is set in the broadcast program information receiving apparatus 200D (step ST51).

Next, in the access control section 220, the access controller 202 obtains an access permissible time to a data server corresponding to the set provider name by referring to the provider-to-provider access time table 210 (step ST52).

Then, the access controller 202 monitors the time information from the timer 201, and issues a command to the data server access section 203 when the time information matches the access permissible time so that a data transfer request is made to the data server 100 (steps ST53 and ST54).

The data server access section 203 makes a data transfer request to the data server 100 in accordance with a command from the access control section 220 via the low-speed line 400, and sends the broadcast program information downloaded from the data server 100 to the data management section 204 (step ST55).

The data management section 204 stores the downloaded broadcast program information in the temporary storage area 205, and manages the data of the broadcast program information (step ST56). In this manner, the broadcast program information is downloaded from the data server 100 to the broadcast program information receiving apparatus 200D.

The user using the broadcast program information downloaded to the broadcast program information receiving apparatus 200D makes a data transfer request to the broadcast program information receiving apparatus 200D from the application of the terminal device 300. The broadcast program information receiving apparatus 200D transmits the data transfer request to the data management section 204 via an application access section 206. The data management section 204 issues, to the temporary storage area 205, an instruction for transmitting the data of the broadcast program information to the terminal device 300. The temporary storage area 205 sends the requested broadcast program information to the terminal device 300 by using the high-speed line 500 via the application access section 206. In this manner, it is possible for the user controlling the terminal device 300 to obtain the broadcast program information and to select desired program information therefrom.

Next, a broadcast program information processing apparatus according to a sixth embodiment of the present invention is described below with reference to FIG. 11.

The broadcast program information processing apparatus of the sixth embodiment comprises a means for determining an access permissible time to a data server in accordance with a load distribution state of a data server and for downloading broadcast program information at the determined time. The broadcast program information processing apparatus is constructed in such a way that a data server 100 on a network and a management server 600 for managing the data server are connected to each other by a low-speed line 400, such as a telephone line. In FIG. 11, only the main sections of the broadcast program information receiving apparatus and the management server are shown.

The data server 100 has a database capable of storing broadcast program information, and for the broadcast program information in the embodiment, electronic program guide (EPG) information data are stored therein.

A broadcast program information receiving apparatus 200E comprises an access time setting section 221 for transmitting a desired access time to the management server 600 and an access time memory section 222 for storing an access permissible time to a data server.

The management server 600 comprises a current load management section 601 for managing a current load state of the data server via a client access section 604, a server management section 602 for receiving a desired access time from the broadcast program information receiving apparatus 200E and for sending an access permissible time determined by a load prediction section 603 to the client access section 604, the load prediction section 603 for determining an access permissible time to the data server on the basis of the desired access time from the broadcast program information receiving apparatus 200E and the current load distribution state of the data server and for sending the permissible time to the server management section 602, and the client access section 604 for receiving the desired access time from the broadcast program information receiving apparatus 200E, for receiving, from the server management section 602, the access permissible time determined by the load prediction section 603, and for transmitting it to the broadcast program information receiving apparatus 200E.

The operation between the management server 600 and the broadcast program information receiving apparatus 200E, having the above-described construction, is described below with reference to the flowchart shown in FIG. 12.

Initially, the broadcast program information receiving apparatus 200E sends several desired access times to the management server 600. The management server 600 receives the desired access times by the client access section 604 (step ST61).

The client access section 604 sends the desired access times to the load prediction section 603 via the server management section 602 (step ST62).

The load prediction section 603 receives the desired access time of the broadcast program information receiving apparatus 200E and the current load distribution state of the data server 100 from the current load management section 601, and determines the access permissible time to the data server 100 of the broadcast program information receiving apparatus 200E by considering the distribution of the load (step ST63).

The determined access permissible time is transmitted from the client access section 604 to the broadcast program information receiving apparatus 200E via the server management section 602 (step ST64).

The broadcast program information receiving apparatus 200E receives the access permissible time and stores the time in the access time memory section 222 (step ST65). In this manner, the access time to the data server 100 of the broadcast program information receiving apparatus 200E is determined.

As has thus been described, since an access permissible time to a data server on a network is set for each broadcast program information receiving apparatus, accesses to the data server are spread out, the load on the data server and the traffic of a communication line are reduced, yielding the advantage that the response and the downloading time of the data server, and communication cost-performance can be improved.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. An information processing apparatus comprising:
    a data server having a database for storing program information;
    a plurality of program information receiving apparatuses having a means for accessing said data server and first means for downloading said program information;
    one or more terminal devices, coupled to one or more of the plurality of program information receiving apparatus by second means for downloading; and
    a random number generator for generating a random time;
        wherein the first means for downloading of each of said program information receiving apparatuses has a table in which access times to said data server are set for each region, and downloads said program information from said data server at a determined time, set by said table,
        wherein the random time is used to modify the determined time, and
        wherein the first means for downloading has a lower transmission rate than the second means for downloading.

2. The information processing apparatus according to claim 1, wherein the determined time is a function of the random time based on a preset time.

3. The information processing apparatus according to claim 1, wherein the determined time is a function of a time set by a management server which manages said data server.

4. The information processing apparatus according to claim 1, wherein the determined time is a function of a time set by a table, the table adapted to store access times for the data server.

5. The information processing apparatus according to claim 4, wherein said table includes region codes in which postal codes are identifiers.

6. The information processing apparatus according to claim 4, wherein said table includes region codes in which telephone area codes are identifiers.

7. The information processing apparatus according to claim 4, wherein said table includes region codes in which codes for urgent warnings are identifiers.

8. The information processing apparatus according to claim 1, wherein the determined time is a function of a time set for a service provider that is adapted to be connected to said program information receiving apparatus.

9. The information processing apparatus according to claim 1, wherein the determined time is a function of a load distribution state of said data server, that downloads said program information at a determined access time.

* * * * *